United States Patent [19]

Knop et al.

[11] Patent Number: 4,756,722
[45] Date of Patent: Jul. 12, 1988

[54] DEVICE FOR GASIFYING COAL

[75] Inventors: Klaus Knop, Geldern; Günter Wolters, Düsseldorf; Helmut Kubiak, Herne, all of Fed. Rep. of Germany

[73] Assignee: M.A.N. GHH, Fed. Rep. of Germany

[21] Appl. No.: 24,012

[22] Filed: Mar. 10, 1987

Related U.S. Application Data

[62] Division of Ser. No. 865,989, May 21, 1986.

[30] Foreign Application Priority Data

May 21, 1985 [DE] Fed. Rep. of Germany ....... 3518260
Jan. 9, 1986 [DE] Fed. Rep. of Germany ....... 3600432

[51] Int. Cl.⁴ .............................................. C10J 3/56
[52] U.S. Cl. ................................... 48/73; 48/89; 48/99; 60/39.12
[58] Field of Search ............... 48/89, 99, 101, 77, 48/73; 165/104.16; 422/146, 200; 60/39.02, 39.12

[56] References Cited

U.S. PATENT DOCUMENTS 2,225,311 12/1940 Lysholm ........................ 60/39.04
2,619,415 11/1952 Hemminger ..................... 48/202
4,019,314 4/1977 Springmann .................... 60/39.02
4,212,652 7/1980 duPont ............................ 48/89

FOREIGN PATENT DOCUMENTS 3228532 2/1984 Fed. Rep. of Germany .

Primary Examiner—Barry S. Richman
Assistant Examiner—Joye L. Woodard
Attorney, Agent, or Firm—McGlew and Tuttle

[57] ABSTRACT

Part of the synthesis gas produced by coal gasification in an allothermically heated fluidized bed reactor is burned after removal of dust and sulfur and serves as a source of energy to heat the reactor by indirect heat exchange and to produce the steam required for the gasification process. The flue gas exiting from the heat exchanger of the reactor can be used to perform work in expansion turbines. The rest of the synthesis gas is available for use in downstream processes, such as iron ore reduction, or can be burned and used to perform work in turbines to produce electric current. The result is a process that is environmentally safer and operates with a better yield than direct coal burning or autothermal coal gasification, but requires no outside source of energy, such as nuclear power, as prior art allothermal coal gasification processes do.

6 Claims, 4 Drawing Sheets

DEVICE FOR GASIFYING COAL

This is a division of application Ser. No. 845,989 filed May 21, 1986.

FIELD AND BACKGROUND OF THE INVENTION

The present invention relates in general to the field of gasification for carbon-containing fuel, and in particular to a new and useful process and device for gasifying carbon-containing fuel, in particular coal, whereby a portion of the produced synthesis gas is burned to heat a fluidized bed reactor in which the fuel is gasified.

In coal gasification, a distinction is made between "autothermal" and "allothermal" processes. In autothermal gasification, the heat needed to sustain the gas-forming reactions is produced by combustion reactions that take place in the reactor itself. Not just coal and steam, but air and/or oxygen as well, are fed into the reactor, so that incomplete or sub-stoichiometric combustion of the coal occurs as synthesis gas is produced. In practice, this means that a considerable portion, typically about 30–40% of the coal is lost in the production of heat and only the remainder is converted into available product gas. Another disadvantage is that the available gas is loaded with combustion products and, unless pure oxygen is used for processing, the gas is also loaded with a large proportion of ballast material in the form of nitrogen, which diminishes its usefulness and means that the downstream purification and desulfurizing units must be built correspondingly larger in size. Finally, the relatively high temperature produced in the reactor by the combustion reaction is also disadvantageous, because it makes it more difficult to maintain the fluidized bed and may favor the formation of nitrogen oxides ($NO_x$) harmful to the environment. Also known to the art are autothermal coal gasification processes wherein a portion of the gas produced is recycled to the reactor and again takes part in the reaction (e.g. German Pat. No. 32 23 702).

In allothermal gasification, heat is supplied from an outside source. Apart from the coal dust, essentially only steam is introduced into the reactor to act as a reaction medium and to sustain the fluidized bed, while the reaction heat required for gasification is essentially provided by an exchange of heat by the reactor with a hot heat exchange medium fed in from the outside. In this process, the coal can be converted essentially completely into available gas, and the produced gas is largely free of combustion residues, nitrogen ballast, etc. Furthermore, the temperature in the reactor can be kept at a lower or optimal level for the gas-forming reaction. The problem there, however, is that to heat the heat exchange medium to be fed into the reactor, an additional source of heat and hence a corresponding demand for primary energy is required. The allothermal process is most advantageous if a nuclear reactor is available to act as such an additional source of energy. In such case, a secondary helium cooling circuit heated by the primary helium cooling circuit of the nuclear reactor can serve both as a heat exchange medium for heating up the reactor and also for the production of the steam required in the reactor (see van Heek and Kirchhoff In "HdT-Vortragsveröffentlichungen" (Haus der Technik Lecture Publications), 453, 1982, p. 59).

SUMMARY OF THE INVENTION

The present invention provides a process of the kind indicated, that makes use of the advantages of allothermal gasification of the coal or fuel but requires no outside sources of heat, as well as a device with which to perform the process.

Accordingly an object of the present invention is to provide a process for gasifying a carbon-containing fuel, in particular coal, with subsequent use of a product gas therefrom, comprising supplying finely ground or atomized carbon-containing fuel to a fluidized bed reactor, gasifying the fuel in the reactor by means of an essentially allothermal gasification reaction and by feeding in steam to the reactor, heating the reactor by indirect heat exchange with a heat exchange medium, with synthesis gas being produced in the reactor from the fuel, removing dust and sulfur from the synthesis gas to form purified synthesis gas, burning at least a portion of the purified synthesis gas to form hot flue gas, and using the resulting hot flue as the heat exchange medium to heat the reactor.

A further object of the present invention is to provide a device for performing this process which includes a fluidized bed reactor with a heat exchanger therein, feed means for feeding ground coal or other carbon containing fuel to the reactor, purifying means for purifying gas produced by the reactor to remove dust and sulfur from the gas, steam producer means connected to the reactor for producing steam and for supplying steam to the reactor, and heating means for heating up a heat exchange medium to be fed to the heat exchanger, the heating means comprising a combustion chamber for receiving the purified synthesis gas to burn the gas and form the heat exchange medium.

The process of the invention makes it possible to run an allothermal gasification reactor without the aid of an additional heat source, because the requisite heat is obtained by burning a portion of the available product gas. In this process, to be sure, as is the case with the autothermal process, only part of the coal is ultimately converted into available gas, but the other disadvantages described above of the autothermal process are avoided.

The process pursuant to the invention is particularly advantageous when the flue gas obtained by burning the product synthesis gas is used for power production, and is preferably used in one or more expansion gas turbines. In such case, the product of the process as a whole is not available product gas but electrical power, and the system as a whole constitutes a power plant. Customarily, in coal-fired power plants the coal is burned and the flue gas used to run the gas turbines or produce steam is obtained directly from that. In comparison, the process pursuant to the invention whereby the coal is first degasified and the gas is then burned would seem at first glance to involve unnecessary extra expense. The process pursuant to the invention, however, does offer substantial advantages over direct coal-burning. Since the synthesis gas produced by degasification is already purified and desulfurized, the flue gases deriving from the subsequent burning of the gas do not require further purification. Since the volume of the synthesis gas is substantially smaller than that of the flue gases, the expense involved in removing dust and sulfur is correspondingly less. While with direct coal burning, flue gas with a high $NO_x$ content is produced, with coal gasification, because of the substantially lower temperatures in the gasification reactor, the formation of nitrogen oxides is largely eliminated, and even the subsequent burning of the synthesis gas can be controlled in such a way that nitrogen oxide formation is substantially lower than with coal burning.

The process pursuant to the invention thus proves to be particularly sound from an environmental standpoint. A power plant operating with such a process can thus be run in whole or in part even on fuels that contain heavy amounts of pollutants. In particular, solid household or industrial refuse, waste oil or the like, if necessary with an appropriate admixture of coal, can be fed into the reactor. The pollutants contained in them remain for the most part in the solid slag removed from the reactor. To the extent that they are transferred to the product gas, they are separated by gas purification before the burning step, so that flue gas purification is no longer necessary. Such a power plant can therefore be built in or near residential areas, which is advantageous with respect to the power-heat connection.

Accordingly a further object of the invention is to provide a process which efficiently gasifies carbon-containing fuel, and a device for performing that process which is simple in design, rugged in construction and economical to manufacture.

The various features of novelty which characterize the invention are pointed out with particularity in the claims annexed to and forming a part of this disclosure. For a better understanding of the invention, its operating advantages and specific object attained by its uses, reference is made to the accompanying drawings and descriptive matter in which preferred embodiments of the invention are illustrated.

DESCRIPTION OF THE PREFERRED EMBODIMENTS

Figure 1:
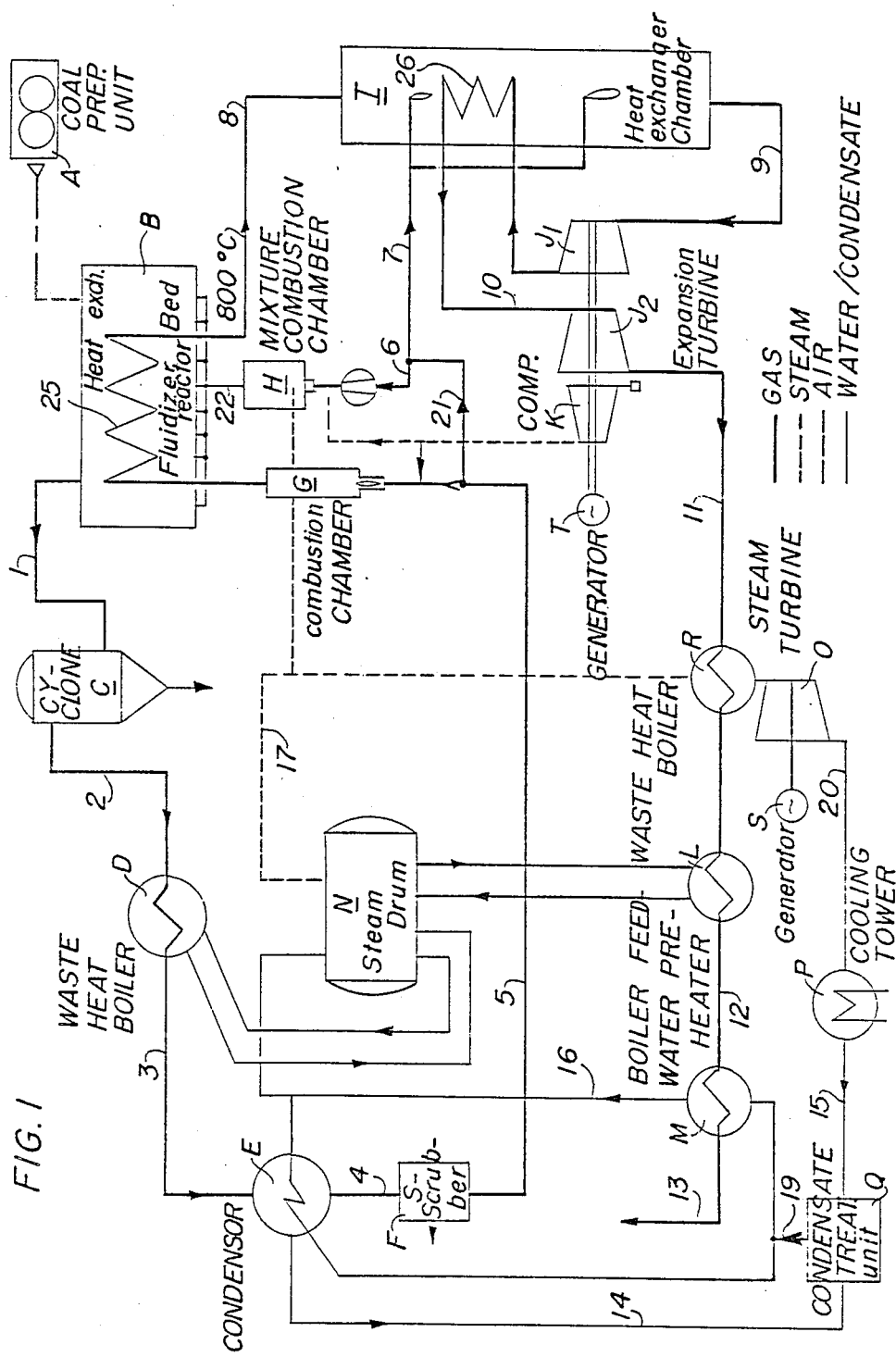
FIG. 1 is a flow chart of the process pursuant to the invention where the synthesis gas is used for power production.

Referring to the drawings in particular, the invention embodied therein comprises a process and device for the gasification of carbon-containing fuel, in particular coal.

Coal ground in a coal mill A is conveyed via an appropriate system of locks (with the aid of a propellant gas) to a fluidized bed reactor B. The coal is gasified allothermally in the reactor by means of a steam/flue gas mixture (primarily steam) produced in a combustion chamber H and conveyed to the reactor B via line 22. The required reaction heat is supplied by indirect heat exchange with flue gas, which flows through a heating coil or heat exchanger 25.

The synthesis gas leaving the reactor B via line 1 is freed of dust in a cyclone separator C and corresponding filter devices. Via line 2, the gas (at 800°-900° C.) enters a waste-heat boiler D and leaves it via line 3, in order to be cooled in a condenser E to the point that it can enter a suitable sulfur scrubber F over a line 4.

The desulfurized gas leaving the sulfur scrubber F goes via line 5 to a combustion chamber G, where it is burned sub-stoichiometrically to the point where the resulting flue gas is at a temperature of approx. 900° C. This flue gas enters the heat exchanger 25 of the reactor B.

In reactor B, the amount of heat required for the gasification reaction is taken from the flue gas (a portion of the heat supply also comes from the steam/flue gas mixture from H). The flue gas leaving the reactor via line 8 at, for instance, 750°-800° C. enters a burner heat exchanger chamber I, where it serves to reheat the flue gas proceeding via line 10 from the first step $J_1$ to the second step $J_2$ of an expansion turbine. The flue gas leaving the burner/heat exchanger chamber I via line 9 enters the first step $J_1$ of the expansion turbine at a pressure of, for example, 40 bar. The flue gas leaving the second step $J_2$ via line 11 at, for example, a final pressure of 1.2 bar and a temperature of 250° C. is first fed into a heat exchanger R to superheat the steam and then cooled in a waste-heat boiler L and fed to a boiler feed-water preheater M after a line 12 and subsequently to a chimney via line 13.

The steam produced in the waste-heat boilers L and D is collected in a steam collecting drum N and superheated in R. The steam is then expanded through a steam turbine O, which drives a generator S. The condensation heat of the expanded steam is conveyed to a cooling tower P over a line 20 and and via line 15 to a condensate treatment unit Q, as is the condensate from E via line 14. The treated condensate is then fed back into the process via line 19. The feed water conveyed via line 16 from the preheater M is used for steam production.

A portion of the steam leaving the steam collecting drum N is conveyed via line 17 to the combustion chamber H, where the steam is directly mixed, and thereby superheated, with hot flue gas that is derived from the combustion of a portion of the synthesis gas that comes from line 5, is conveyed via line 6 to the combustion chamber and is burned with combustion air from compressor K.

Combustion in H should preferably be stoichimetric, but can also be sub-stoichiometric. If the operating method is sub-stoichiometric, the free oxygen serves to provide additional heat by the combustion of C or CO in the reactor B via the coal feed line (by using air as the propellant gas).

The quantity of free oxygen that should be supplied to the reactor B with the air must be optimized in any case (e.g. the greater the quantity of oxygen that is brought into the process in the air, the greater the quantity of $N_2$ in the synthesis gas and hence the greater must be the design capacity of units C, D, E and F; conversely, however, the heat exchanger in B can be designed smaller).

In such cases, therefore, a certain amount of autothermal heat production takes place in the reactor B, which can also affect the composition of the gas. This amount, however, is so small in any case that the process does not lose its overall allothermal character.

A further portion of the synthesis gas from line 5 can be fed to the burner/heat exchanger chamber I via line 7, where it is burned and produces extra hot flue gas, which is mixed with the flue gas from 8, so that the temperature of the flue gas fed into the gas turnbine $J_1$ can be raised again to, for example, 900°–1000° C. Higher temperatures than that are generally inappropriate because of the heat stress on the turbine blades.

The expansion turbines $J_1$ and $J_2$ that admit the flue gas drive a generator T to produce electric current. In addition, the turbines may drive compressor K that compresses the combustion air that is fed to combustion chambers G and H via line 21 to, for example, 40 bar, whereby the air is simultaneously heated to a temperature of over 600° C., for example.

The flue gas produced in combustion chamber G is involved only in an indirect heat exchange with the reactor B. It is advantageous to have the combustion in the combustion chamber G carried out under heavily superstoichiometric conditions so that, first of all, the volume of the gas is greater and the energy release in the expansion turbines $J_1$, $J_2$ is correspondingly increased and, secondly, the gas exiting the heat exchanger 25 via line 8 still carries surplus air for the combustion of the additional synthesis gas fed to the burner/heat exchange chamber I via line 7.

With the system described, which is used for power production, efficiencies (terminal output) of 42–45% can be achieved, depending on the application.

The advantages of this combined power plant in comparison with convetional coal-fired systems with the flue gas desulfurization can be summarized as follows:
(a) better efficiencies;
(b) lower cost of producing electric current;
(c) substantially lower water requirements;
(d) reduced heat losses; and
(e) possibility of locating the plant in the vicinity of environmentally-protected districts.

If gasification in the reactor B is performed at temperatures of between 700° and 800° C. and at pressures of around 40 bar, one can obtain per ton of coal about 3,200 m$^3$ of product gas with approximately the following composition (% by volume): 58% $H_2$, 2% CO, 30% $CO_2$, 10% $CH_4$. The $CO_2$ content can be eliminated by a $CO_2$ scrubber, and the proportions of $H_2$ and $CH_4$ increased to 83% and 14% by volume, respectively, which means that a conversion step can be eliminated that is necessary as a rule with gas obtained by autothermal gasification. The fact that no oxygen is required for the gasification is another considerable advantage over autothermal processes. For combustion in the combustion chambers approximately ⅓rd of the quantity of gas is required, so that about 2,000 m$^3$ of gas per ton of coal are available for combustion in the heat exchanger chamber I or for other purposes.

In the embodiment shown in FIG. 2, which differs in some details, the process works as follows:

After milling and drying (M1), the prepared coal is blown into the gasifier (V1), where it is up to 97% gasified in a fluidized bed with the aid of steam. The steam enters the gasifier at a temperature of 850° C., after it has passed through the heat exchanger W14 in the combustion chamber BK1. The heat required for gasification is fed to the reaction chamber via the heat exchanger W17. The ashes and the residual carbon (ungasified coal) are discharged via a cellular wheel sluice and a system of locks (M2).

The raw gas leaving the gasifier V1 via a double cyclone (Z1/Z2) is cooled by passing through the raw gas cooling train W1 to W7 and in the quencher T3, whereby the water vapor is condensed out of the raw gas and the evaporation heat is thus utilized. The condensate is fed to a water treatment unit and is returned to the process via a boiler feed water treatment. The use of process water is thereby reduced to a minimum. The cooling train W1 to W6 is used to produce intermediate pressure steam at drum T1 (25 bar) or low-pressure steam at drum T2 (3.6 bar). The cooled raw gas is fed to a sulfur scrubber. This scrubber operates according to an oxidative process. The $H_2S$ contained in the raw gas is converted directly into S by means of air (LO-CAT process). The sulfur can be removed in solid form.

Via the heat exchangers W7 and W16, a portion of the now purified raw gas (synthesis gas) goes to the burner of the combustion chamber BK1. In this combustion chamber, the synthesis gas is burned with air coming from the compressor K1/2, in order to enter the heat exchanger W17 of the gasifier V1 at a temperature of 950° C., after raw gas (F2/K3) or steam (from T1) recirculated in the heat exchangers W15 or W16 has been heated to 850° C.

The air/flue gas mixture leaves reactor W17/V1 at a temperature of 800° C. After passing through heat exchanger W16, it enters the first step GT1 of the expansion turbine GT at 760° C. In GT1, pressure is reduced from 20 bar to 7.5 bar. The off gas from GT1 goes to a combustion chamber BK2, which is hooked up upstream of the second step, GT2 and heated with another portion of the synthesis gas, and the off gas is again heated up (reheating). In the turbine or turbine step GT2, pressure is reduced to 3 bar. In combustion chamber BK3, the rest of the synthesis gas is burned with the residual oxygen in the flue gas from GT2 (2nd reheating). In turbine GT3 pressure is dropped to 1.05 bar.

The flue gas leaving the expansion step GT3 at approximately 600° C. enters a flue gas cooler WR with heat exchangers W9 to W13. In drum and heat exchanger combination T5/W10, high-pressure steam (45 bar) is produced that is superheated in W9 to 480° C. In combination T4/W12, low-pressure steam (3.6 bar) is produced. The flue gas leaves WR after an economizer W13 at 105° C.

Both the high-pressure and the low-pressure steam from T2 or T4 are fed into a steam turbine DT1. Both steam turbine and the GT1 as well drive the compressor K/2. Both gas turbine steps GT2 and GT3 are coupled with a generator G. The condensate from the steam turbine DT1 is cooled by means of a cooling tower KTL and pumped back into the cycle.

Figure 2:
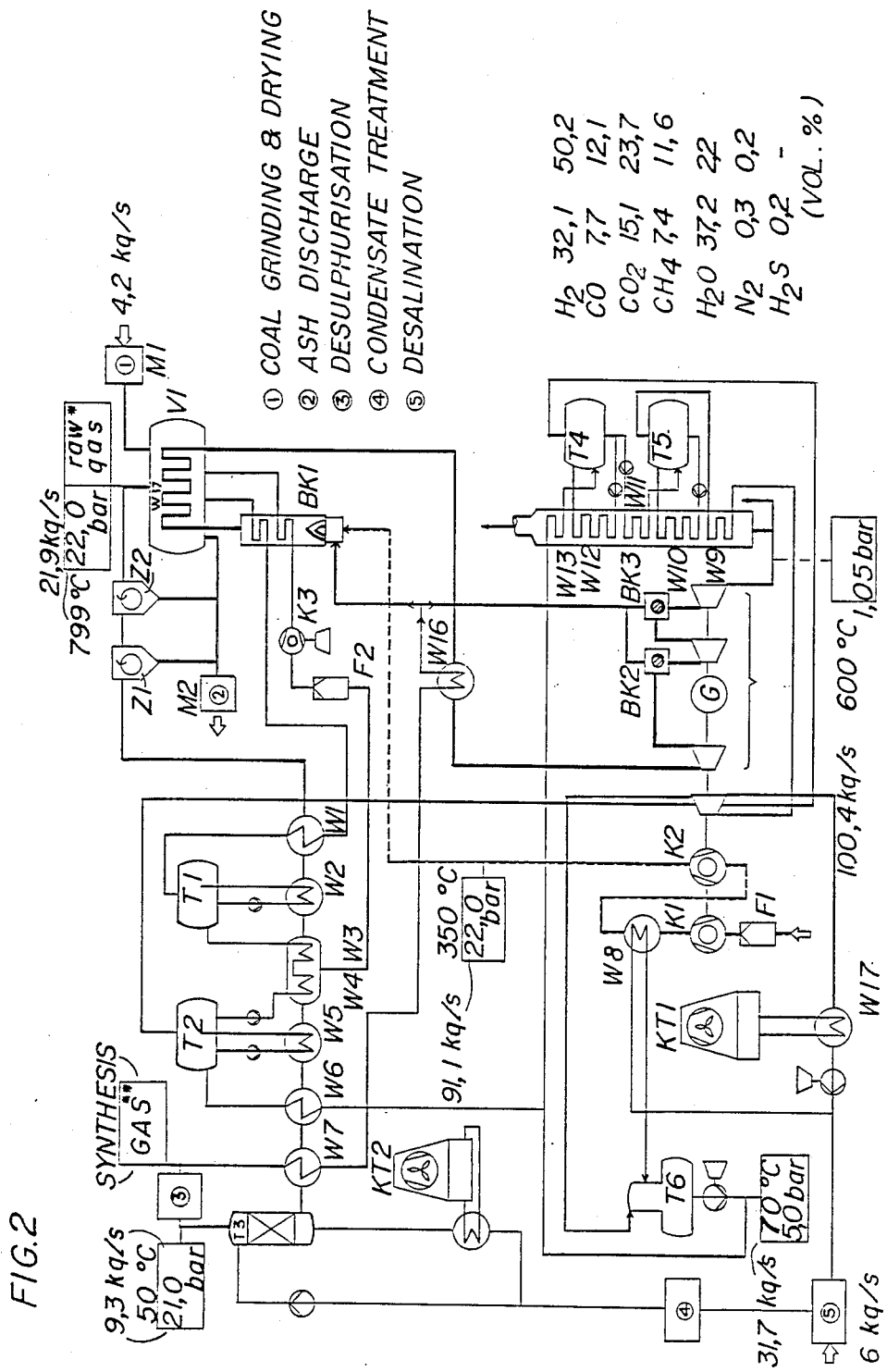
FIG. 2 is a similar flow chart to that of FIG. 1, but for different embodiment of the invention.
Figure 3:
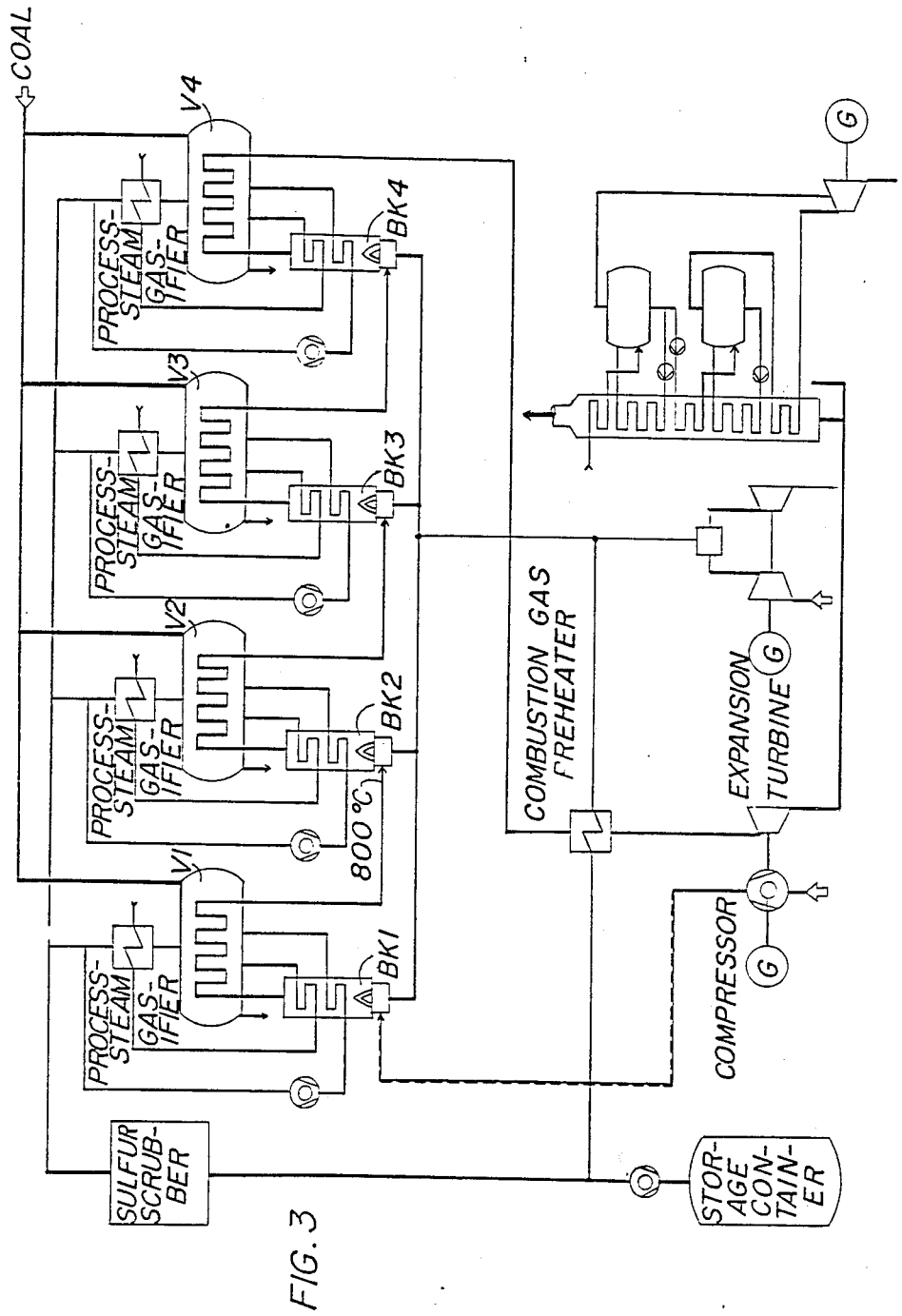
FIG. 3 is a flow chart of a different embodiment of the process with several gasification reactors connected in series.

For structural and operational reasons, the size and hence the capacity of the gasification reactor B or V1 in the embodiments pursuant to FIGS. 1 and 2 are necessarily limited, which means that the quantity of energy produced or the output of the power plant is limited as well. The process, however, can readily be expanded for greater capacity by using several gasifiers. An example of such an embodiment is shown in FIG. 3.

The mixture of air and flue gas exiting the first gas producer V1 enters the combustion chamber BK2 of the second gas producer V2 at 800° C. There the air/flue gas mixture is reheated by combustion of a portion of the synthesis gas, the flue gas and steam are heated to 880° C., and the flue gas, which still has a high oxygen content, is fed to the heat exchanger of the second gasifier V2 at 950° C. This process can be repeated with additional gasifiers V3 and V4 and burners BK3 and BK4, i.e. repeated four times, for example, using as a basis the data given in FIG. 1. The four gasifiers are thus hooked up in parallel with respect to fuel feed and synthesis gas discharge, but in series with respect to flue gas feed to the heat exchangers.

The flue gas (with an $O_2$ content of 6%) exiting the last heat exchanger is fed to an expansion turbine. This expansion turbine drives the air compressor. The surplus power of 12 MW can be given out (to the network). The flue gas, which still has a temperature of approximately 350° C., is used to produce steam.

The synthesis gas produced is fed into the combustion chamber of a gas turbine unit (after desulfurization). Electric power production by means of this combined power plant is similar to that shown in FIG. 2.

If the plant shown in FIGS. 1, 2 or 3 is run with less output, surplus synthesis gas can be produced which is put under pressure of, for example, 200 bar via another compressor and conveyed to a storage container (FIG. 3). If electric current production must be increased suddenly, the synthesis gas is expanded out of the storage container into the combustion chamber of the gas turbine. The gas turbine can thus be brought up very quickly. The storage capacity must be great enough that the gasifier can be brought up to full capacity within that space of time.

The invention is not limited to the embodiments described, which are used only for power production. The synthesis gas produced by the coal gasification can also be used as process gas for downstream processes to the extent that it is not burned up in heating the reactor. If the process is altered in this way, the combustion shown in FIG. 1 of the surplus synthesis gas conveyed via line 7 in the heat exchanger I would be eliminated, and instead of that the process gas line of a downstream processing step would be hooked up to line 7. One would continue, however, to use the flue gases leaving the heat exchanger coil of the reactor B via line 8 to perform work in expansion turbines $J_1$, $J_2$, which could also serve for power production, but at the least for driving the compressor K.

As examples of other uses for the unburned surplus of synthesis gas, we might mention:

USE AS TOWN GAS

After the $CO_2$ is removed by scrubbing, the product gas produced in the reactor B already meets the specifications for town as in terms of its calorific value. Conversion and methanation are not necessary.

PRODUCTION OF SPONGE IRON

After removal of the $CO_2$ by scrubbing, the product gas can be fed into the reducing gas circuit of a reduction reactor for sponge iron. Another hook-up with the process schema depicted in the drawing is possible and consists of having the reducing gas circuit flow through a heat exchanger coil placed in the heat exchanger chamber I and be thereby heated in an indirect exchange of heat by the flue gases exiting the reactor B.

PRODUCTION OF STEEL

Again in this instance, the product gas is fed via line 7 to a reduction reactor, which it passes through only once. The furnace gas that results in the reduction reactor can be fed to the heat exchanger chamber I and there burned, so that exta hot flue gas is obtained to be admitted into the expansion turbines $J_1$, $J_2$. With the current produced in generators S and T, the sponge iron can be melted together with scrap iron in an electric arc furnace. The result is a mini steel plant, which is suitable for regions with poor quality scrap and poor electric power supply and is particularly safe for the environment.

In addition, the product gas produced in the reactor B is particularly suitable to be methanized for production of SNG or to be converted directly into methanol.

Figure 4:
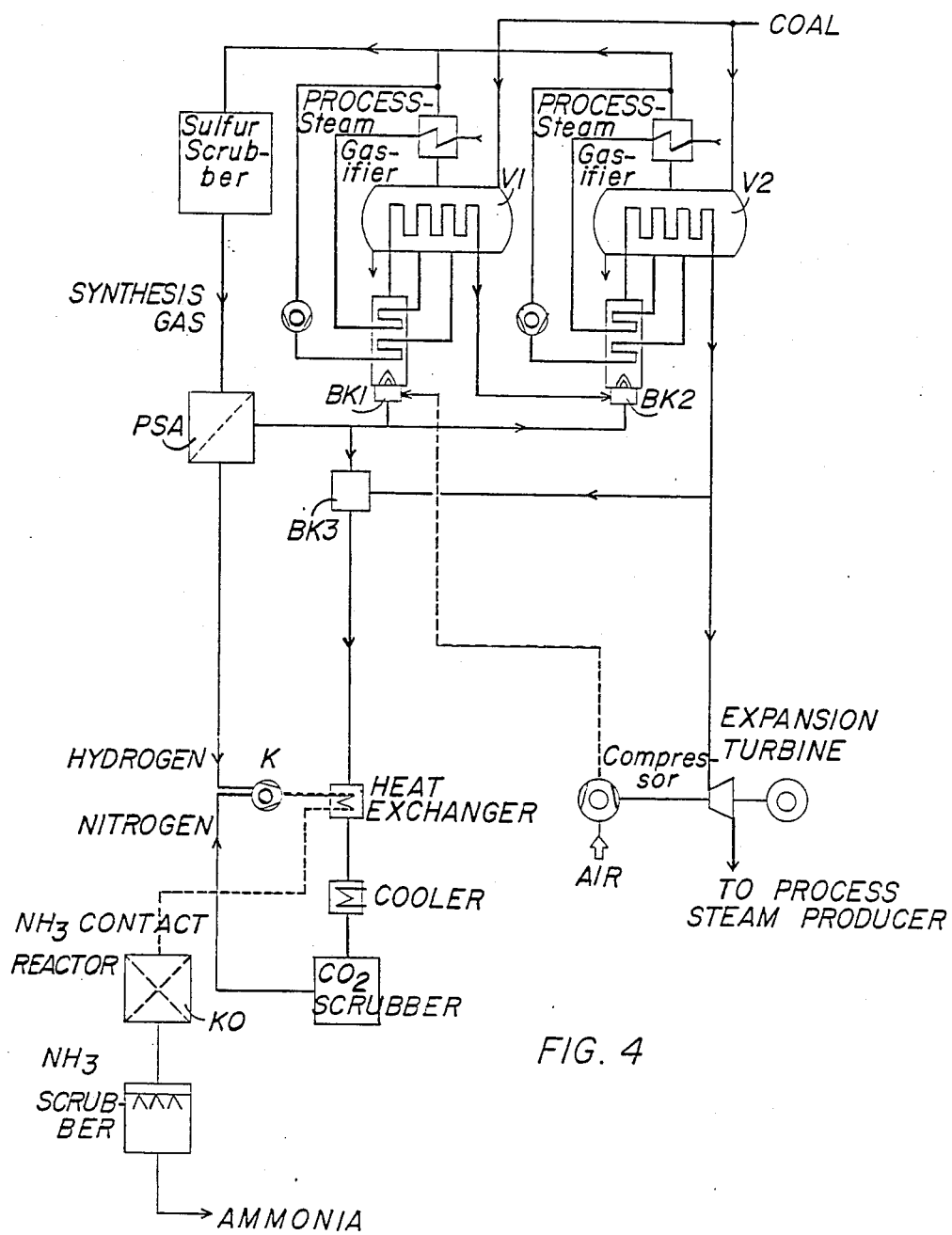
FIG. 4 is a flow chart for another embodiment of the process pursuant to the invention where the synthesis gas is used to produce ammonia.

Another example of the use of the synthesis gas is shown in FIG. 4. Here the synthesis gas is used to produce ammonia. In this case, two gasifiers V1, V2 are provided, which are hooked up in series in the same way as described for FIG. 3. Part of the synthesis gas discharged from each gasifier V1, V2 is recycled in order to use the water vapor contained in it as process steam. The rest of the synthesis gas is subjected to a sulfur scrubbing and then to a molecular sieve PSA process, in which the $H_2$ hydrogen is separated out of the synthesis gas. The remainder of the synthesis gas, consisting primarily of $CO_2$ is conveyed to the combustion chambers BK1 and BK2 in order to produce the flue gas for the indirect heating of the gasifiers V1, V2.

From the total flue gas discharged from the second gasifier V2, a portion is diverted and conveyed to a combustion chamber BK3, where it is after burned stoichiometrically with a portion of the synthesis gas coming from the molecular sieve PSA process, so that the resulting flue gas now contains essentially only $N_2$ and $CO_2$. After cooling, the $CO_2$ is removed by a CO-scrubber. The remaining nitrogen is mixed with the hydrogen from the molecular sieve PSA process and condensed by a compressor K to 200 bar, heated and fed to an $NH_3$ contact reactor KO, where the reaction between hydrogen and nitrogen results in the formation of ammonia, which is then washed out by a $NH_3$ scrubber.

The process may be taken further by causing the produced ammonia to react with the sulfur derived from the desulfurization of the synthesis gas in order to produce ammonium sulfate. The result is an environmentally safe, artificial fertilizer plant that can also produce process steam and perhaps power as well.

While specific embodiments of the invention have been shown and described in detail to illustrate the application of the principles of the invention, it will be understood that the invention may be embodied otherwise without departing from such principles.

What is claimed is:

1. An apparatus for producing electricity from carbonaceous fuel comprising: a fluidized bed reactor for producing synthesis gas; indirect heat exchange means positioned within the fluidized bed reactor for conveying a heat exchange medium therethrough and supplying heat to the fluidized bed reactor for an essentially allothermal gasification reaction, said heat exchange means having a heat exchange medium inlet and a heat exchange medium outlet; feed means for feeding ground coal to the reactor; a synthesis gas conduit connected to said reactor for conveying synthesis gas exiting from said reactor; purifying means connected to said gas conduit for removing dust and sulfur from the synthesis gas exiting from the reactor; steam conduit means having a steam inlet connected to said reactor for supplying steam to said reactor; heating means including a combustion chamber and burner connected to said gas conduit downstream of said purifying means for receiving and burning a portion of the synthesis gas and for producing flue gas to serve as the heat exchange medium, said burner being connected to said heat exchange medium inlet; burner heat exchange chamber means connected to said heat exchange medium outlet, and to said synthesis gas conduit for burning another portion of the purified synthesis gas to produce flue gas mixed with the flue gas from said heat exchange medium outlet and having a combined flue gas outlet; a flue gas line connected to said combined flue gas outlet; an expansion turbine connected to said flue gas line for rotation upon expansion of flue gas; and, generator means connected to said expansion turbine for production of electricity.

2. An apparatus according to claim 1, further comprising: a partially expanded flue gas conduit connected to said expansion turbine to receive partially expanded flue gas from said expansion turbine, said partially expanded flue gas conduit including a heat transfer element passing through said burner heat exchange chamber means for receiving heat from said burner heat exchange chamber means; second expansion turbine connected to said partially expanded flue gas conduit downstream of said partially expanded flue gas conduit heat transfer element, said second expansion turbine being connected to said generator for rotating the generator in cooperation with said expansion turbine.

3. An apparatus according to claim 1, further comprising: a compressed air conduit; a mixture combustion chamber connected to said synthesis gas conduit for receiving another portion of the synthesis gas, to the steam conduit means upstream of the steam inlet and to said air conduit for providing additional heat to the reactor by supplying a mixture of steam and flue gases thereto through said steam inlet; a compressor rotatively connected to said turbine for providing compressed air to said mixture combustion chamber.

4. An apparatus according to claim 1, further comprising: a compressed air conduit connected to said combustion chamber; and, a compressor rotatively connected to said expansion turbine and connected to said compressed air conduit for supplying compressed air to said combustion chamber.

5. An apparatus according to claim 1, further comprising a turbine exhaust conduit connected to said expansion turbine for exhausting expanded flue gas; steam heating means including a heat transfer element connected to said turbine exhaust conduit, said steam heating means a portion of the steam from said steam conduit means and outputting heated steam; and, steam turbine means for receiving heated steam from said steam heating means for rotation of said steam turbine; and, generator means connected to said steam turbine for rotation with said steam turbine for production of electricity.

6. An apparatus according to claim 1, further comprising: steam production means for producing steam and for supplying steam to said steam conduit means.

* * * * *